June 16, 1964

W. J. SCHAFER ETAL 3,137,534

PRE-WIRED CRISS-CROSS CONTROL PANEL

Filed Oct. 12, 1961

INVENTORS
WILLIAM J. SCHAFER &
RAY C. BLEILER

BY Fay & Fay

ATTORNEYS

June 16, 1964  W. J. SCHAFER ETAL  3,137,534
PRE-WIRED CRISS-CROSS CONTROL PANEL
Filed Oct. 12, 1961  3 Sheets-Sheet 2
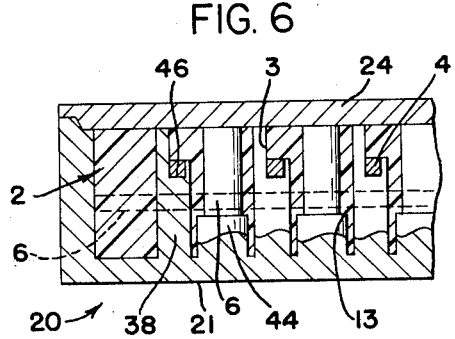
FIG. 6
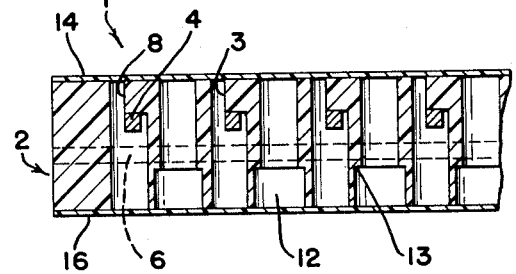
FIG. 7
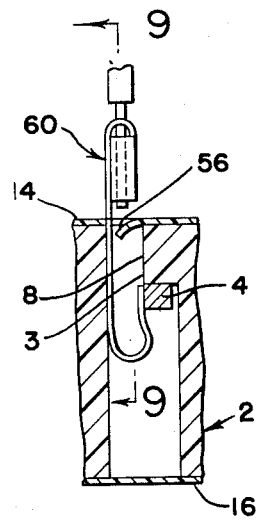
FIG. 8
FIG. 9
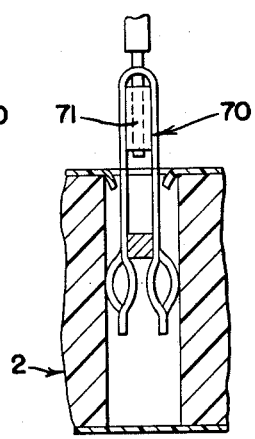
FIG. 10
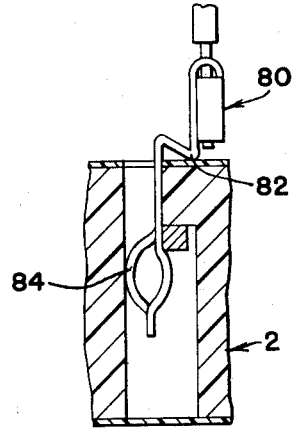
FIG. 11
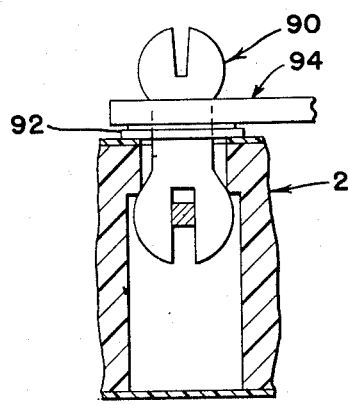
FIG. 12
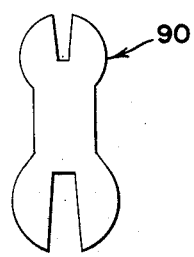
FIG. 13
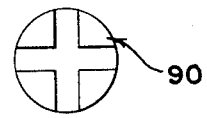
FIG. 14
INVENTORS
WILLIAM J. SCHAFER &
RAY C. BLEILER
BY
Fay & Fay
ATTORNEYS

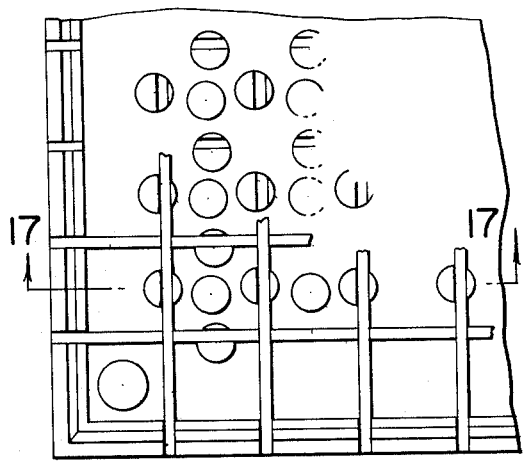
FIG. 15
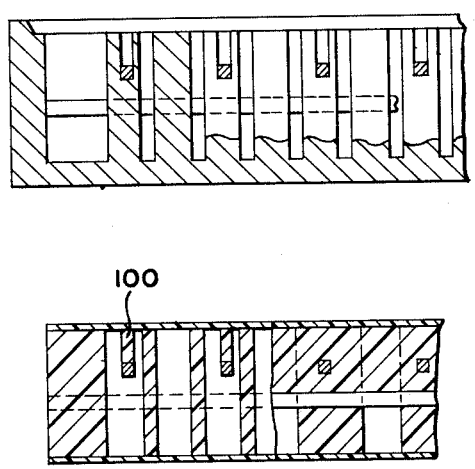
FIG. 17
FIG. 18
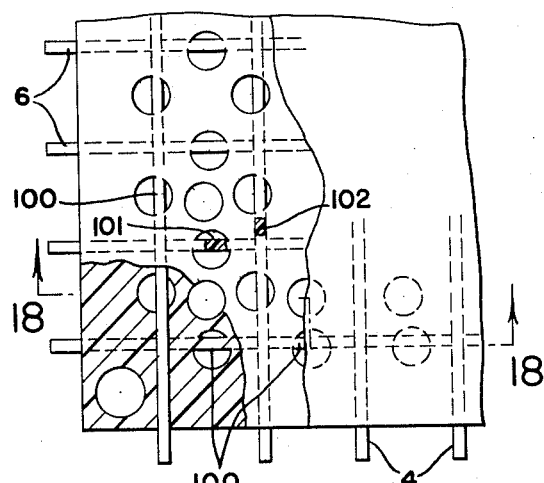
FIG. 16
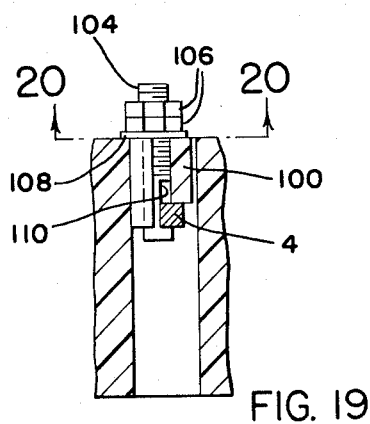
FIG. 19
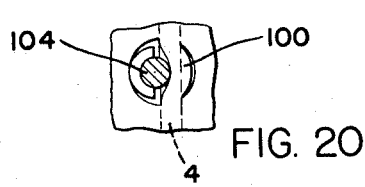
FIG. 20
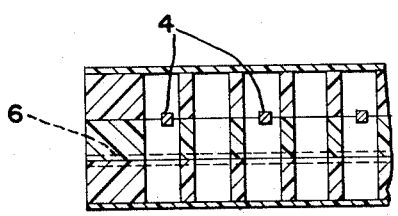
FIG. 21
INVENTORS
WILLIAM J. SCHAFER &
RAY C. BLEILER
BY
*Fay & Fay*
ATTORNEYS

United States Patent Office 3,137,534
Patented June 16, 1964

3,137,534
PRE-WIRED CRISS-CROSS CONTROL PANEL
William J. Schafer, 18048 David, Cleveland, Ohio, and Ray C. Bleiler, 1762 Empire Road, Wickliffe, Ohio
Filed Oct. 12, 1961, Ser. No. 144,639
10 Claims. (Cl. 339—18)

This invention relates to a preformed electrical circuit panel structure having standard conductor patterns for use with a variety of components to produce a plurality of electrical circuits of varying design. More particularly, the invention relates to a criss-cross control panel of special thermosetting plastic that is reinforced with additives and combines light weight and high strength, and eliminates the use of complicated assembly methods and time consuming design procedures.

Various types of preformed panel constructions for electric circuit applications have been devised with a view toward simplifying the art of electrical manufacturing. However, in most if not all of the cases, the problem of cost has resulted from the fact that panel boards of a given design have had only limited application and could not be used universally for all types of circuits.

A further problem of the prior art structure has been produced by exposed adjacent conductor portions which permit arcing and shorting across the terminal connection holes. Moreover, the terminal connection bores in the universal panels heretofore produced have permitted exposure of the conductors to corrosion from the atmosphere with attendant loss of efficient current carrying ability.

In addition, it has been found that upon inserting terminals into the mounting bores of the conventional so-called universal panels, the tension exerted on the conductors during insertion of the terminals is a cause of physical damage to the structure with the result that the conductors and terminal connections are not reliable under conditions of vibration which are often encountered in circuit use.

With the foregoing problems in mind, it is an object of the invention to provide a universal electrical circuit panel construction which may be adapted easily for use with a multitude of various components in different circuit arrangements.

A further object of the invention is to minimize the design time required for adapting a so-called universal electric circuit panel board to specific circuit uses.

A further object of the invention is to provide an electrical circuit panel construction resistant to the adverse effects of humidity and vibration.

Other and more specific objects of the invention will become apparent from the following disclosure and the drawings.

In the drawings:

FIG. 6 is a view similar to FIG. 4 during curing of the panel construction;

FIG. 7 is a view of the product after removal from the mold, taken along the line 7—7 of FIG. 2;

FIG. 8 is an enlarged fragmentary view of FIG. 7 with a preferred form of terminal attached to the panel;

FIG. 9 is an elevation of FIG. 8 taken along the line 9—9 of FIG. 8;

FIG. 10 is a modified form of the terminal;

FIG. 11 illustrates a still further modification of the terminal;

FIG. 12 is yet another terminal modification;

FIG. 13 is a detached view of the terminal of FIG. 12 in a relaxed position;

FIG. 14 is a bottom plan view of FIG. 12;

FIG. 15 is a modified form of mold for constructing the panel board where the wires will be supported by webs of material integral with the panel;

FIG. 16 is a plan view similar to FIG. 2 of the modified panel, with parts broken away;

FIG. 17 is a sectional view along line 17—17 of FIG. 15;

FIG. 18 is a sectional view along line 18—18 of FIG. 16;

FIG. 19 is a terminal for attaching to the panel;

FIG. 20 is a plan view on the line 20—20 of FIG. 19 showing the terminal slightly distorting the web which supports the wire; and FIG. 21 is a further modification of the panel board construction showing it in laminated form.

Referring now more particularly to the drawings where like numerals designate like parts in the several views:

Figure 1:
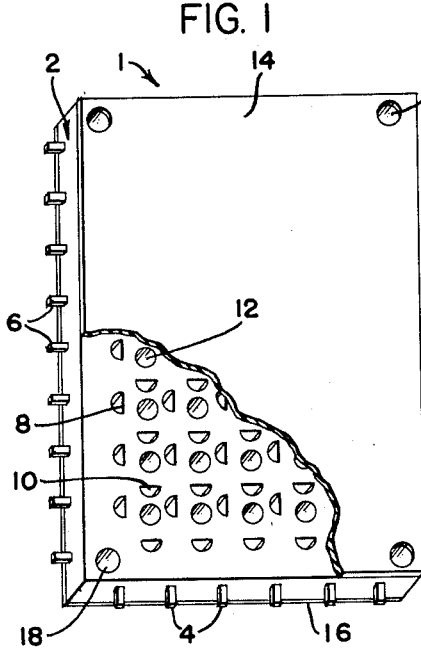
FIG. 1 is a perspective view, with parts broken away, of the novel panel board construction according to the principles of this invention.

FIG. 1 illustrates a panel board according to the principles of the invention, generally designated by the numeral 1; the panel board comprising a perforated block of plastic material 2, embedding and supporting a plurality of parallel conductors 4 adjacent one surface thereof and a plurality of parallel conductors 6 adjacent the opposite surface of the block 2 in spaced intersecting transverse relationship to the conductors 4. Within the plastic body material 2 are a plurality of apertures 8 arranged in rows and columns so as to expose portions of the conductors 4 at regularly spaced intervals substantially midway between the points of intersection of the conductors 4 and 6. Alternately arranged to form separate rows and columns are apertures 10 which expose side portions of the conductors 6 at regularly spaced intervals, substantially midway between the points of intersection of the conductors 4 and 6. The shape of the apertures 8 and 10 is such that the conductors 4 and 6 are supported on at least one side by integral shelf portions 3 of the insulation block 2 which hold the conductors rigidly in position and resist the tension forces created during connection of terminals therewith. This also helps to insure that the points of intersection of the embedded conductors are not exposed and, therefore, no arcing or shorting is possible through the air between the conductors 4 and 6.

A third set of apertures 12 arranged in rows and columns extends through the block 2 but does not expose any portions of the conductors. These holes are used for the mechanical mounting of the various active and passive components to be used in connection with the circuit desired.

On the outer surface of the block of plastic insulating material 2 skins 14 and 16 are disposed which cover all of the apertures 8, 10, and 12. These skins 14 and 16 are preferably of transparent Mylar and provide important protection from short circuits, vibration, and corrosion for the portions of the conductors exposed by the various apertures. Holes generally designated as 18 are also provided through the entire structure including the block 2 and the skins 14 and 16, for mechanically mounting the panel board on support structures or other panel boards, thereby giving greater versatility to the basic panel structure and permitting consolidation of several panels for more universal application of the standard panels. The conductors 4 and 6 are dimensioned such that their ends are exposed along the edge of the block 2 to provide convenient external terminal connections for use with other panels and circuitry means.

Figure 2:
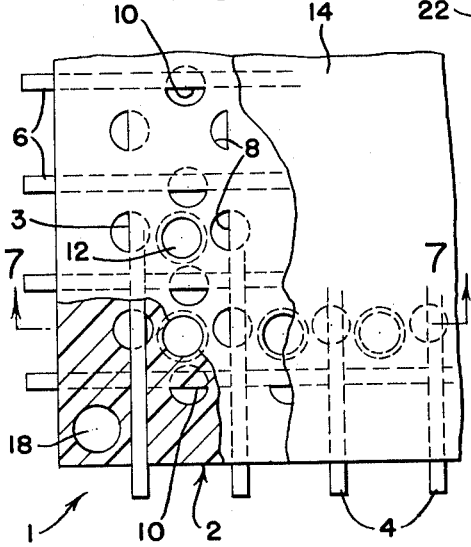
FIG. 2 is an enlarged fragmentary plan view, with parts broken away.

FIG. 2 is an enlarged plan view of the panel board construction illustrating the arrangement of the various rows and columns of apertures and the exposed conductor ends. The symmetrical spacing illustrated is the preferred arrangement of structures produced in accordance with the principles of the invention, in that it provides a maximum amount of dielectric material between each conductor and the adjacent conductor portions.

Any suitable plastic material having sufficient strength and dielectric properties may be used for the block 2. The embedded conductors, of course, provide reinforcement for the cast structure. It is generally preferred that a thermosetting plastic be used because it sets up into a structure durable under all temperature and humidity conditions. Since the invention may be used for control circuits or electronic circuits, the dimensions of the universal circuit panel will vary accordingly. For instance, for use in control circuits the dimensions of the pattern will be such that the holes 8 for the conductors 4 will be spaced laterally $3/8$ inch from the holes 10 for the conductors 6. This provides, in effect, the shifting of the rows and columns $3/8$ inch when measured from the hole center to hole center. Holes 8 and 10 of this structure are of a diameter of $1/4$ or $5/32$ inch. The conductors are disposed in their respective holes, such that they are $2/32$ inch from the farthest point of the bore surface on one side of the conductor and $5/32$ inch from the farthest point on the bore surface on the other side of the conductor, the conductors being $1/32$ inch wide. This offset arrangement, of course, is to provide for mounting of terminal elements beside the conductor in the bore of the hole as illustrated in FIG. 8, for instance.

The mounting apertures 12 are counterbored as shown at 13 and have annular seats at their ends adjacent the side of the block to facilitate the component mounting. These seats are provided to permit a high density arrangement of components on the panel board. The provision of the integral plastic conductor supporting shelves 3 in the apertures 8 and 10 adjacent a single side of the panel board is preferable, but not necessary, in that it enables the use of a mold 20 having projections from only one side.

Figure 3:
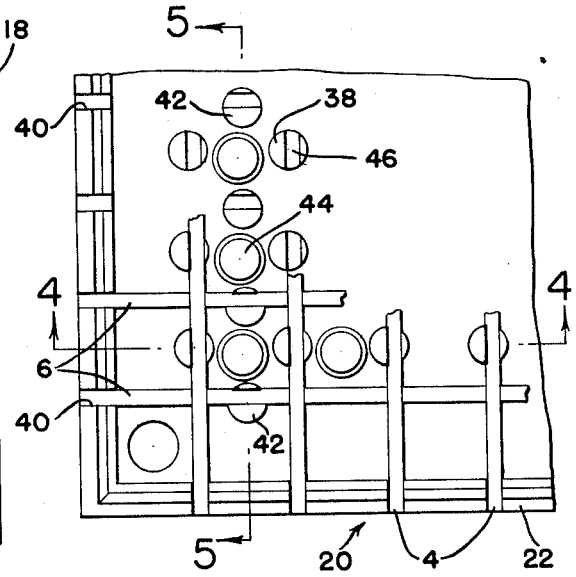
FIG. 3 is a fragmentary plan view of one form of mold for producing the panel board, showing the wires in position.

FIG. 3 is a plan view of the mold, with conductors 4 and 6 in position and the cover removed. In positioning the conductors 4 and 6, it is preferable to first insert all of the conductors 4 in the holes 40 in the walls 22 of the mold 20 by inserting a first end and then flexing the conductor intermediate its ends to shorten it until the second end clears the mold wall and is located in alignment with its respective hole and then straightening the conductor and thereby inserting the second end in its hole 40. Of course, straight-through threading also may be used to place the conductors in the holes 40.

Figure 4:
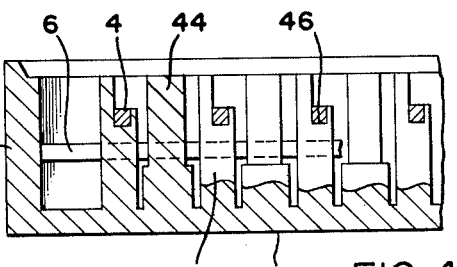
FIG. 4 is a sectional view along line 4—4 of FIG. 3.
Figure 5:
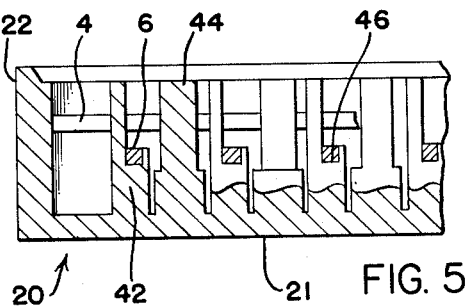
FIG. 5 is a sectional view along line 5—5 of FIG. 3.

FIGS. 4 and 5 are cross-sectional views along the lines 4—4 and 5—5, respectively, of FIG. 3. The mold 20 consists of a flat plate 21 having walls 22 and a series of projections 38, 42, and 44 thereon for forming the holes 8, 10, and 12, and a flat cover 24 therefor. The projections, or posts, may be formed integrally with the plate 21 or comprise separate inserts mechanically attached to either or both of the mold parts. A preferred method is to use the projections extending from only one part of the mold. The mold 20 is of suitable dimensions, such as 6 feet on a side and may have drilled therein at regular intervals holes defining the pattern of rows and columns with the projecting pins 38, 44, and 42 inserted therein. The mold projections and the mold sides 22 are provided with conventional mold drafts of perhaps $1/10,000$ inch per inch to permit removal of the cast panel from the mold structure. Of course, conventional mold release agents may be used, such as sprayed silicons, to facilitate this removal. The molding process may be either a pressure injection procedure or a gravity flow static casting procedure, depending upon the particular casting equipment available. However, it is preferred that a pressure injection system be used to provide a dense and uniform dielectric body to isolate and support the conductors.

Each of the mold inserts described has at the exposed end thereof a slot 46 dimensioned to receive the conductors 4 and 6 and is of one of two predetermined lengths depending on whether it is to hold the conductors 6 or the conductors 4. An alternative method of making the mold is to provide a flat block of metal and drill, tap, and grind the pattern of projections with slots and draft as described above.

The conductors actually hang in the mold and protrude into the mold wall 22. FIG. 6 illustrates the mold 20 having the conductors 4 and 6 disposed therein with mold cover 24 on the mold and the plastic body 2 cast and cured under heat.

As shown at 3, there is a provision for plastic material backing up the conductors to give them support and prevent damage during the insertion and connection with terminal connectors.

After the block 2 with the embedded conductors has been cured in the mold as shown in FIG. 6, it is removed and the Mylar skins 14 and 16 are applied to the outer surfaces. Mylar skins are preferably transparent so that in making connections accurate insertions may be made.

FIGS. 8 and 9 illustrate one preferred form of terminal connection showing a terminal 60 which has ruptured the Mylar skin 14 at 56. The terminal 60 has an integral sheet metal piece having bight portions at either end and an integral ferrule portion on the short end of the exposed bight portion for receipt of a conductor terminal. The bight at the opposite end of the terminal 60 is somewhat larger and provides for a resilient spring action between the side of the hole 8 and the conductor 4. The conductor terminal protrudes through a hole in the smaller bight and into the ferrule where it is held in gripping relation.

FIG. 10 illustrates a similar terminal structure for use in boards having the conductors centered in the hole and having a design which allows engagement of a conductor on either side of the hole. This terminal 70 has a single bight portion with a hole for receipt of a conductor terminal in an intermediate ferrule portion 71 for gripping the conductor terminal member. Within the bore of the hole 2 integral spring portions grip the conductor and wedge in springing relation with the bore of the hole in opposing relation thereto to provide a firm connection.

FIG. 11 illustrates a terminal member 80 having a bight portion in a generally Z-shaped configuration which permits the axial forces to be presented to the plastic body structure 2. This arrangement is adapted particularly where the frictional side engagement of the hole is not deemed sufficient to prevent axial movement of the terminal 80 within the hole as the limiting portion 82 effectively supports the weight of the structure above it. An integral spring portion 84 formed by a slit and spread of the sheet stock provides a firm engagement with the conductor for good electrical connection.

FIG. 12 illustrates a terminal member 90 in mounted position which is for jumping to adjacent rows and columns for connection of particular circuits. It comprises a generally cylindrical body having expanded portions with perpendicular slots on either end and is adapted for mounting similarly to the terminal member 70 of FIG. 10. Washers 92 are provided to limit the axial movement of the terminal in the bore of the hole and a conductive bar 94 is pivotal on the axis of the number 92 to any radial position in alignment with another like terminal 90 for the crossover connection.

Of course, many variations of the terminal forms may be devised and frictional, mechanical, or threaded mountings are possible. The mounting portions 3 of the plastic body 2 which supports the conductors as they pass through the holes 8 and 10 permit rather strong gripping action and consequently good transfer between the terminal connectors and the conductors. Threaded type connectors using conventional conductive studs have been used but are found generally less satisfactory in view of the difficulty in maintaining good threads in the plastic body 2 due to the relaxation and distortion of the plastic which is inherent during temperature change in cast plastic structures.

FIG. 15 illustrates a modification of the mold set up as described earlier in connection with FIG. 3. In this modification, shown in cross-section in FIG. 17, the conductors are enclosed entirely in slots in the projecting portions of the mold, such that a web 100, as shown in FIG. 18, is formed to back up and support the conductor members. This, of course, produces better dielectric conditions and permits further modification of the mounting procedure.

FIG. 18 ilustrates a plan view of a structure made with conductors entirely enclosed in the slots of the projecting portions.

FIGS. 19 and 20 illustrate a method of connection by "grabbing," which is particularly adapted for use with the web type panel illustrated in FIGS. 16 and 18. As previously mentioned, a threaded connection directly to the plastic body 2 usually is not satisfactory due to distortion and relaxation of the stresses in the cast plastic product. However, a conductive terminal of the type illustrated which is a threaded semicylindrical sleeve, may be mounted in connection with a stud 104 and secured by nuts 106 and washers 108 in the bore of the portion adjacent the web 100. The dimensions of the various parts are such that the web 100 must be depressed laterally away from the conductor 4 or 6 to enable passage of the stud 104 into the aperture. A cut-out portion 110 is provided in the side of the stud for engaging and gripping the conductor. This method, of course, is used preferably with the square type conductor wires and provides the opposing motion such that when the nuts 106 are turned down, the reaction of the flange defining the cut-out portion 110 with the square conductor compresses the web 100 therebetween to form a firm vibration-damped connection with the conductor which is well supported and cannot be dislodged by means other than the unscrewing of the nut 106. It will be noticed that a lock nut is provided to avoid inadvertent loosening by vibration.

FIG. 21 illustrates a further modification of the panel construction indicating that a laminated construction of the board according to the principles set forth is feasible. However, such a construction has the inherent disadvantage of the increased labor in laying out the conductors and the separate laminates in the proper order and position. Such a structure, when completed, however, is capable of embodying all of the advantages and forms of the previously described cast structures.

From the foregoing description, it should be apparent that this invention contemplates a universal pre-wired panel board which permits the elimination of complicated design and manufacturing procedures for each and every circuit desired. The transparent Mylar skins are the preferred method of providing resistance to the effects of humidity and vibration in that after they have been punctured with the terminal members they, in effect, reseal themselves around the terminal members. Of course, plastic filler material and plugs may be used to facilitate this function of the Mylar. Moreover, on either side of the plastic, a type of insulating material, such as urethane foam or polystyrene foam, can be used providing it can be broken through easily to contact the wire. This plastic, of course, may be added either before or after the terminal connections to the conductors. Such a structure is adapted for use particularly in adverse climates where there are marine and salt water problems in that the copper of the conductor, or other material of the conductors, will not be corroded.

There is also a provision in the invention whereby a serrated toothlike circular saw or other suitable perforating means may be used to cut and break connections in the various holes where desired or in random board locations. This provides for the elimination of unwanted connections in the circuit panel to adapt it to the particular circuit design being produced and contributes to the universal nature of the board. After such a cut has been made a liquid plastic filler, or insulator, or plug can be used in the aperture. This process of bisecting the longitudinal conductors 4 or the transverse conductors 6 at various hole locations, or in random board location is brought out diagrammatically in FIG. 16, whereat a cut and the subsequent filling by a plastic filler is shown in a hole position by the numeral 101, and a cut and a subsequent filling by a liquid plastic or insulator in a non-hole random position is shown by the numeral 102.

Thus, it will be seen that the invention produces a truly universal wiring panel construction which provides good dielectric isolation of all conductors and permits great voltages per unit where used under all types of applications. Moreover, the provision of the support for the conductors within the terminal connection holes strengthens the board to the point that a high density of mounting holes and conductive connection holes is provided without subsequent electrical or mechanical breakdown of the structure. This support contributes to the universal nature of the board and allows all types of circuit mountings in the apertures of the various rows and columns.

It is not applicant's intention to be limited by the described embodiments nor the terminology used herein, but rather applicant intends to be limited only by the scope of the appended claims.

What is claimed is:

1. A preformed universal electric circuit panel for connecting and supporting components in a multitude of circuit patterns comprising a perforated block of plastic material having a first group of parallel conductors embedded therein and a second group of parallel conductors embedded therein spaced from and transverse to said first group of parallel conductors, a first set of perforations arranged in rows and columns exposing portions of each of the conductors of said first group and spaced from each of the conductors of said second group, a second set of perforations arranged in rows and columns exposing portions of each of the conductors of said second group and spaced from each of the conductors of said first group, a third set of perforations arranged in rows and columns and spaced from all of said conductors adapted to receive component support members, whereby a plurality of circuit patterns may be produced on said panel by external connecting conductors electrically joining selected exposed portions of the conductors and components supported by said panel.

2. The structure of claim 1 in which the first and second set of perforations expose only a portion of the circumference of the conductors at any given point along their length.

3. The structure of claim 1 in which other perforations which destroy the continuity of at least one of the individual conductors are randomly positioned in the panel structure.

4. The structure of claim 3 in which the randomly positioned perforations are filled with plastic.

5. The structure of claim 1 in which transparent laminations of plastic are disposed over the opening of the perforations.

6. The structure of claim 5 in which component supports, terminals, and conductors extend through closely fitting perforations in the transparent laminations.

7. A preformed universal electric circuit panel for connecting and supporting components in a multiple of circuit patterns comprising a perforated block of plastic material having a first group of parallel conductors embedded therein and a second group of parallel conductors embedded therein spaced from and transverse to said first group of parallel conductors, a first set of perforations arranged in rows and columns exposing portions of each of the conductors of said first group and spaced from each of the conductors of said second group, a second set of perforations arranged in rows and columns exposing portions of each of the conductors of said second group and spaced from each of the conductors of said first group, a third set of perforations arranged in rows and columns and spaced from all of said conductors adapted to receive component support members, and external connecting means electrically joining selected exposed portions of the conductors and components supported by said panel including, integral sheet metal pieces having bight portions at either end and an integral ferrule portion on the outermost bight portion for receipt of a conductor terminal.

8. A preformed universal electric circuit panel for connecting and supporting components in a multitude of circuit patterns comprising a perforated block of plastic material having a first group of parallel conductors embedded therein and a second group of parallel conductors embedded therein spaced from and transverse to said first group of parallel conductors, a first set of perforations arranged in rows and columns exposing portions of each of the conductors of said first group and spaced from each of the conductors of said second group, a second set of perforations arranged in rows and columns exposing portions of each of the conductors of said second group and spaced from each of the conductors of said first group, a third set of perforations arranged in rows and columns and spaced from all of said conductors adapted to receive component support members, and external connecting means electrically joining selected exposed portions of the conductors and components supported by said panel including, an integral sheet metal member having a single bight portion with a hole for receipt of a conductor terminal in an intermediate portion for gripping the conductor terminal.

9. A preformed universal electric circuit panel for connecting and supporting components in a multitude of circuit patterns comprising a perforated block of plastic material having a first group of parallel conductors embedded therein and a second group of parallel conductors embedded therein spaced from and transverse to said first group of parallel conductors, a first set of perforations arranged in rows and columns exposing portions of each of the conductors of said first group and spaced from each of the conductors of said second group, a second set of perforations arranged in rows and columns exposing portions of each of the conductors of said second group and spaced from each of the conductors of said first group, a third set of perforations arranged in rows and columns and spaced from all of said conductors adapted to receive component support members, and external connecting means electrically joining selected exposed portions of the conductors and components supported by said panel including, an integral sheet metal member of generally Z-shaped configuration with one end thereof having a spread slit spring portion under compression in its respective perforation.

10. A preformed universal electric circuit panel for connecting and supporting components in a multitude of circuit patterns comprising a perforated block of plastic material having a first group of parallel conductors embedded therein and a second group of parallel conductors embedded therein spaced from and transverse to said first group of parallel conductors, a first set of perforations arranged in rows and columns exposing portions of each of the conductors of said first group and spaced from each of the conductors of said second group, a second set of perforations arranged in rows and columns exposing portions of each of the conductors of said second group and spaced from each of the conductors of said first group, a third set of perforations arranged in rows and columns and spaced from all of said conductors adapted to receive component support members, and external connecting means electrically joining selected exposed portions of the conductors and components supported by said panel in which at least two of the external connecting means are comprised of cylindrical bodies having expanded portions with perpendicular slots at either end and washers intermediate the ends to limit actual movement in the perforations, and said external connecting means being connected by a conductive bar pivotally mounted thereon.

References Cited in the file of this patent

UNITED STATES PATENTS

| 2,889,532 | Slack | June 2, 1959 |
| 3,028,573 | Stoehr | Apr. 3, 1962 |

FOREIGN PATENTS

| 750,244 | Great Britain | June 13, 1956 |